April 1, 1969  J. C. DE FELLIPPIE ET AL  3,436,561
VOLTAGE DEVIATION SENSOR
Filed Feb. 17, 1965
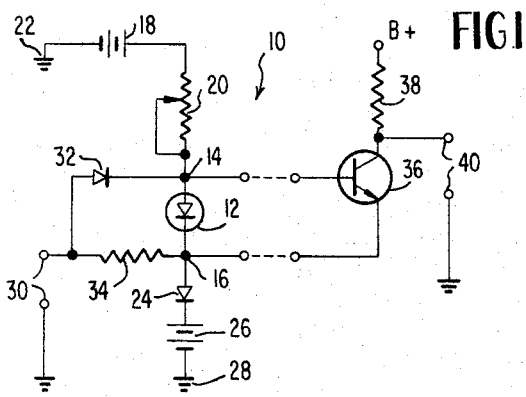
FIG.1
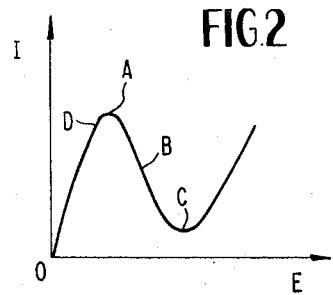
FIG.2
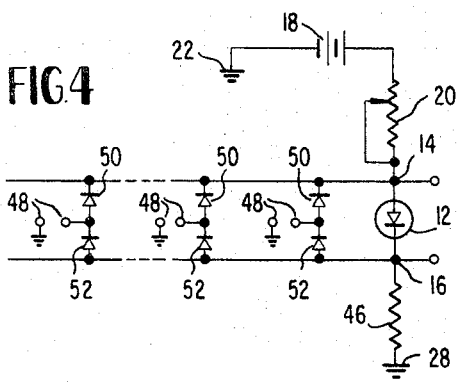
FIG.4
FIG.3
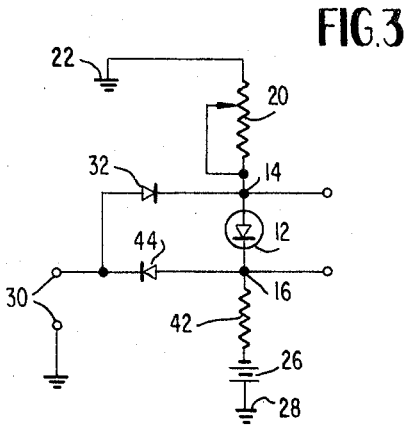
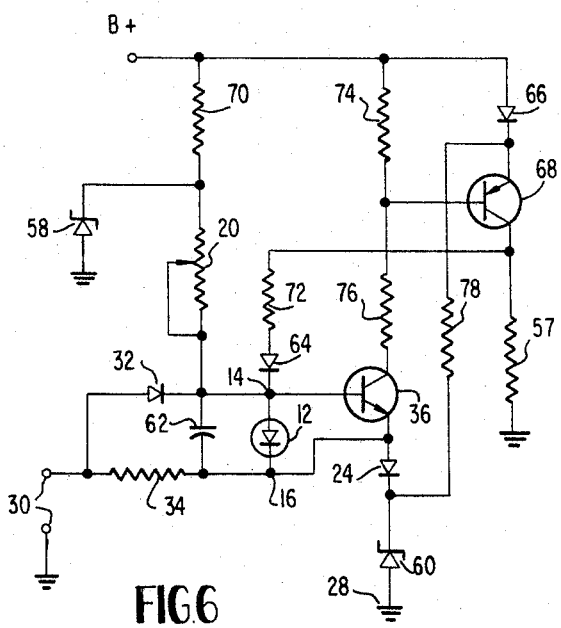
FIG.6
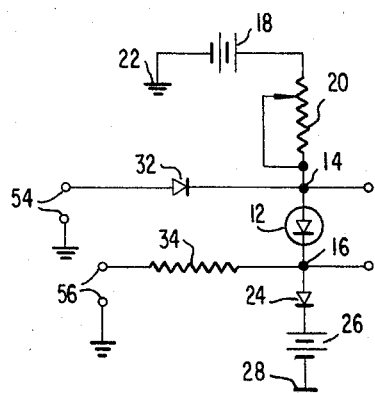
FIG.5
INVENTORS
JOHN C. DeFELLIPPIE
JAMES L. THOMASON
BY Sughrue, Rothwell, Mion,
Zinn & Macpeak
ATTORNEYS United States Patent Office 3,436,561
Patented Apr. 1, 1969

3,436,561
VOLTAGE DEVIATION SENSOR
John C. De Fellippie and James L. Thomason, Denver, Colo., assignors to Martin-Marietta Corporation, Baltimore, Md., a corporation of Maryland
Filed Feb. 17, 1965, Ser. No. 433,366
Int. Cl. H03k *17/58*
U.S. Cl. 307—235
6 Claims

ABSTRACT OF THE DISCLOSURE

This circuit provides an indication whenever an input signal crosses either the upper or lower boundary of a preselected voltage range. A negative resistance device is maintained in one of its stable conduction modes with an upper and lower reference voltage level being established, one at each of its two terminals. The input signal is applied to both terminals of the negative resistance device, and the circuit is so arranged that if the input signal voltage either exceeds the upper limit or drops below the lower limit, the negative resistance device is thrown into its other stable conduction mode.

---

This invention relates in general to an electronic voltage deviation sensor, and more particularly to a novel electronic circuit employing a negative resistance device for sensing voltage variations both above and below predetermined limits.

With the continuing advance of semiconductor technology and the expanding development and use of electronic circuit employing semiconductive elements, a need has arisen for sensing devices capable of accurately monitoring critical voltage levels existing at various points in such circuits. This is due in part to the fact that many semiconductive elements are highly sensitive to environmental conditions, such as temperature, and also because the voltage levels at which such elements commonly operate are comparatively low as contrasted with conventional vacuum tubes and even slight variations in such levels may adversely affect circuit performance. The outputs from the sensing devices may be used to trigger alarms, or, in more sophisticated systems, they may be employed to actuate control circuits for restoring the desired voltage conditions.

The sensing devices of the prior art have been characterized by numerous disadvantages such as circuit complexity, with attendant reduction in overall reliability and increased cost, and the inability to accurately detect voltage variations both above and below predetermined optimal limits. This invention effectively overcomes such disadvantages by providing a novel electronic sensing circuit that is relatively simple in its structural make-up and which advantageously employs a single negative resistance device for detecting such bi-directional voltage variations.

It is therefore, a primary object of this invention to provide a novel electronic circuit capable of accurately detecting voltage variations both above and below predetermined limits, and which is characterized by extreme simplicity, reliability and accuracy.

It is a further object of this invention to provide such a circuit which employs a single negative resistance device, such as an Esaki or tunnel diode, as the sensing element for detecting such voltage variations.

It is a further object of this invention to provide such a circuit which includes means for establishing separate reference voltage levels at both the anode and the cathode of the sensing element, and wherein the respective differences between such levels and the applied voltage signal determines the conduction level of the sensing element. The reference voltage levels may be individually or collectively positive or negative, depending upon the nature of the applied voltage signal, and it is only necessary that the difference between them be such as to slightly forward bias the sensing element under normal conditions.

It is a further object of this invention to provide such a circuit in which a plurality of separate voltages may be simultaneously applied to the circuit in paralel to concurrently monitor their respective deviations, or in which separate voltages may be individually applied to the anode and cathode of the sensing element to monitor one for excursions above the upper limit and the other for excursions below the lower limit.

It is a further object of this invention to provide such a circuit which includes means for detecting and amplifying the voltage drop across the sensing element.

These and further objects and advantages of the invention will be readily apparent to those skilled in the electronics art from a consideration of the following description of several preferred embodiments of the invention, taken in conjunction with the accompanying drawings in which:

FIGURE 1 shows a schematic circuit diagram of a voltage deviation sensor constructed in accordance with the teachings of this invention, FIGURE 2 shows a coordinate plot of a typical voltage-current characteristic of a tunnel diode, FIGURE 3 shows an alternate embodiment adapted to monitor a negative input signal, FIGURE 4 shows several variations which may be incorporated into the circuit of FIGURE 1 to concurrently monitor a plurality of input signals, FIGURE 5 shows the basic sensor circuit with separate voltages applied to the anode and cathode of the sensing element, and FIGURE 6 shows a complete schematic circuit diagram of a sophisticated embodiment of the invention employing a two-stage output amplifier and Zener diodes to establish the reference voltage levels.

Referring now to the drawings, in which the same reference numerals have been used throughout the various figures to designate like structural elements, FIGURE 1 shows the basic sensor circuit 10 including an Esaki or tunnel diode 12 with its anode connected to junction point 14 and its cathode connected to junction point 16. It will be understood that a tunnel diode has been shown by way of example only, and any negative resistance device having similar operating characteristics could be employed in the invention with equal facility. A reference current level is established through tunnel diode 12 by the series combination of a battery 18, a variable resistor 20 and a reference voltage at junction point 16, the negative terminal of the battery being grounded at 22. The reference voltage level is established at junction point 16 by the series combination of a diode 24 and a battery 26, the negative terminal of battery 26 similarly being grounded at 28. The voltage levels sensed at the junction points may have widely varying magnitudes depending upon the predetermined limits selected for the input signal, and it is only essential that the difference between them slightly biases the tunnel diode in the forward direction under normal conditions. The voltage source to be monitored is applied across the input terminals 30, the upper one of which is conected to the junction point 14 through a diode 32 and to the junction point 16 through a resistor 34. The voltage drop across the tunnel diode sensing element may be detected by any number of suitable devices well known in the art, there being shown by way of example an NPN transistor 36 having its base and emitter electrodes connected to the junction points 14 and 16, respectively, and its collector output taken across load resistor 38 by output terminals 40. It will be understood by those skilled in the art that a PNP transistor could be employed as the output device with equal facility by connecting its emitter to junction point 14, its base to junction point 16 and using a B— power supply.

Before describing the operation of the sensor circuit shown in FIGURE 1, it may be well to briefly outline the essential operating and structural characteristics of tunnel diodes in order to facilitate a clear understanding of the invention. These elements consist of highly doped (impurity concentrations on the order of $10^{19}$ net donor or acceptor atoms per cubic centimeter for germanium) semiconductive PN junction devices having extremely narrow or thin junctions (on the order of 150 angstrom units or less), and were first described in an article by L. Esaki, entitled "New Phenomenon in Narrow Germanium P-N Junctions" appearing in the January 1957 issue of the "Physical Review" on pages 603–605. They are characterized by an N-shape operating curve, as shown in the coordinate voltage-current plot in FIGURE 2, having an initial peak or threshold portion A followed by a negative resistance portion B which ends in a stable valley portion C. As the voltage across the junction is increased, the current rises steadily until it reaches the threshold value at A. It then decays rapidly along the negative resistance portion of the curve B and stabilizes in the high voltage-low current portion of the curve at C.

In the circuit of FIGURE 1, the reference current level established through tunnel diode 12 is initially chosen so that when the input voltage at terminals 30 is within its desired range, the tunnel diode 12 is in its low voltage-high current state with the operating point just below the threshold portion of the curve in FIGURE 2 in the vicinity of point D. Under these conditions, the potential across the base-emitter junction of transistor 36 will be sufficient to maintain only a minimum level of conduction, in which case the voltage across the output terminals 40 will be very nearly equal to the B+ power supply voltage.

If the input voltage being monitored at terminals 30 decreases below the predetermined limit established by the reference voltage at junction point 16, the current flow from the battery 18 and through the series path including resistor 20, the tunnel diode 12 and resistor 34 will correspondingly increase. This increased current flow through the tunnel diode causes the operating point of the latter to pass over the threshold portion of the curve at A and to bottom out in the stable valley portion at C, thus placing the tunnel diode in its high voltage-low current state. The greatly increased voltage drop across the diode is now more than sufficient to bias the transistor 36 into a heavily conductive condition. When the transistor conducts heavily the voltage drop across the load resistor 38 increases sharply and this increase is reflected by a corresponding drop in the potential across the output terminals 40. As mentioned earlier, this output drop may be used to actuate an alarm device to signal the voltage deviation, it may be employed to trigger a circuit breaker to shut down the apparatus being monitored or it may be applied to a control circuit which will correct the condition and restore the desired voltage level.

If, on the other hand, the input voltage increases above the upper predetermined limit established by the reference voltage at junction point 16, an increased current flow will result through the series path including diode 32, the tunnel diode 12, diode 24 and the battery 26. Once again, the tunnel diode will transfer to its high voltage-low current state, transistor 36 will be rendered heavily conductive and the output potential across terminals 40 will sharply drop.

It can thus been seen that the circuit of FIGURE 1 will effectively sense any variations in the applied input voltage either above or below the predetermined limits established by the reference voltage at junction point 16. The lower threshold point may be adjusted to the desired voltage level by properly varying the magnitude of resistors 20 and 34 and battery 18, while the upper point may be set as desired by the proper initial selection of the battery 26. As a possible alternative, a potentiometer could be connected across the battery 26 with its movable tap coupled to the cathode of diode 24, thus permitting an adjustable setting of the upper threshold point as well.

In the embodiment of FIGURE 3, the basic sensor circuit has been modified in order to permit the monitoring of negative input voltages. Essentially, battery 18 has been removed, diode 24 has been replaced by a resistor 42, resistor 34 has been replaced by a diode 44 and the polarity of battery 26 has been reversed. The operation is still quite similar to that of the FIGURE 1 circuit in that excursions of the input voltage toward and above the upper predetermined limit established by battery 26, resistor 42 and the peak point curent A, of FIGURE 2, of the tunnel diode 12 will result in increased current flow through the series path including diode 32, the tunnel diode 12, resistor 42 and battery 26, while excursions toward and below the lower limit established by resistor 20 and the peak point current A of the tunnel diode 12 will cause an increased current flow through the path including resistor 20, the tunnel diode 12 and diode 44. In either event, the increased current flow will be sufficient to switch the tunnel diode to its high voltage-low current state, which condition will then be detected by an appropriate output device. It will be appreciated that the upper voltage limit could be slightly positive with the lower voltage limit slightly negative if it were desired to monitor an input signal for fluctuations about the zero level, the essential criteria being that the tunnel diode is normally forward biased to a slight degree and that the input signal is applied to both terminals of the diode, through suitable isolation means as required.

In the embodiment of FIGURE 4, several variations have been incorporated into the basic sensor circuit of FIGURE 1 to further simplify the design and increase the flexibility of the device. As may be seen, the diode 24 and battery 26 have been replaced by a single series resistor 46. In addition, the embodiment of FIGURE 4 has been provided with an indefinite plurality of separate input terminals 48, each one being connected to the anode of the tunnel diode 12 through a positively poled diode 50 and to the cathode of the tunnel diode through a negatively poled diode 52. The resistor 46 serves to establish the upper voltage limit by reason of the voltage drop across it due to current flow from the battery 18 and through diodes 50 while the parallel input arrangement permits the simultaneous monitoring of a plurality of individual input voltages, providing of course, that they all have the same desired operating range. The operation of the embodiment shown in FIGURE 4 is substantially the same as that described above with respect to FIGURE 3, and the diodes 50, 52 provide isolation as between the respective input voltage sources.

FIGURE 5 shows an additional circuit variation in which a pair of separate input voltages may be applied to terminals 54 and 56, the former being connected to junction point 14 through the positively poled diode 32 and the latter being connected to junction point 16 through the resistor 34. With such an arrangement, the voltage applied across terminals 54 will be monitored only for excursions above the upper established limit, while the signal at terminals 56 will only be monitored for variations below the lower established limit.

In the more sophisticated embodiment of FIGURE 6 a two stage amplifier has been provided to supply a more usable output signal across load resistor 57, and Zener diodes 58 and 60 have been employed to accurately establish the reference voltage levels. The capacitor 62 connected across the tunnel diode 12 acts to smooth out transient spikes or spurious noise signals which may be developed in the B+ power supply, while the other additional circuit components provide the necessary biasing levels for the amplifier stages. The positive feedback path through resistor 72 and diode 64 serves to clamp the tunnel diode 12 in its high voltage-low current state after an excursion of the input signal has caused the initial transition. The single B+ power supply provides DC operating potential for both the sensor and the amplifier stages, and Zener diodes 58 and 60 merely replace the batteries 18 and 26 in FIGURE 1 by maintaining constant voltages at their cathodes corresponding to their respective reverse breakdown potentials. The operation of the circuit of FIGURE 6 is basically the same as that of the sensor circuit shown in FIGURE 1, and the amplifier transistors function in the usual manner well known to those skilled in the electronics art.

In an actual circuit constructed as shown in FIGURE 6 an accuracy of +5% was achieved using the following parameters and component values:

| | |
|---|---|
| Tunnel diode 12 | IN2930. |
| Zener diode 58 | IN722A. |
| Zener diode 60 | IN746A. |
| Diodes 24, 32, 64 and 66 | IN645. |
| Transistor 36 | 2N1711. |
| Transistor 68 | HA9510. |
| Capacitor 62 | 2.2 microfarads. |
| Resistor 20 | 5K ohms. |
| Resistor 34 | 178 ohms. |
| Resistor 70 | 619 ohms. |
| Resistor 72 | 4.64K ohms. |
| Resistor 74 | 10K ohms. |
| Resistor 76 | 5.1K ohms. |
| Resistor 78 | 3.48K ohms. |
| Upper trip point | 4.5+0.2 volt. |
| Lower trip point | Adjustable between 4.2 volts and —3.0 volts. |
| Temperature range | 20–30° centigrade. |
| B+ power supply | 24–32 volts. |

It is to be understood that these values merely represent an exemplary form of the invention, and are not to be taken as limiting in any way. In actual practice the accuracy and temperature range of the circuit could be substantially improved through the use of a compensated and closely regulated B+ power supply.

While there have been shown and described several preferred embodiments of the invention, many minor variations and changes therein will be apparent to those skilled in the art. Such are to be deemed as being within the spirit and scope of the invention, and it is the intention to be limited only as defined in the following claims.

What is claimed is:

1. An electronic apparatus for sensing voltage deviations both above and below separate upper and lower predetermined limits, comprising:
   (a) a two terminal negative resistance device characterized by a substantially N shaped voltage-current characteristic,
   (b) means for establishing a reference current and separate reference voltages at each of the two terminals to normally bias the negative resistance device in a low voltage-high current state,
   (c) means for applying a source of input voltage to be monitored to each of the two terminals comprising:
      (1) means for applying excursions of the input voltage above the upper predetermined limit to one of the terminals, and
      (2) means for applying excursions of the input voltage below the lower predetermined limit to to the other terminal, and
   (d) output means connected across the two terminals and responsive to the voltaged drop across the negative resistance device, whereby excursions of the input voltage either above or below the predetermined limits biases the negative resistance device in a high voltage-low current state, which condition is detected by the output means.

2. An electronic apparatus for sensing voltage deviations both above and below separate upper and lower predetermined limits, comprising:
   (a) a two terminal negative resistance device characterized by a substantially N-shaped voltage-current characteristic,
   (b) means for establishing a reference current and separate reference voltages at each of the two terminals to normally bias the negative resistance device in a low voltage-high current state,
   (c) means for applying a plurality of parallel connected input voltage sources to be monitored to each of the two terminals comprising:
      (1) a first network of diodes individually connected between each input voltage source and one of the terminals and arranged for positive to negative conduction in the forward direction from the source to said one of said terminals, and
      (2) a second network of diodes individually connected between each input voltage source and the other terminal and arranged for positive to negative conduction in the forward direction from said other terminal to the source, and
   (d) output means connected across the two terminals and responsive to the voltage drop across the negative resistance device, whereby excursions of any one of the input voltages either above or below the predetermined limits biases the negative resistance device in a high voltage-low current state, which condition is detected by the output means.

3. An electronic apparatus for sensing voltage deviations both above and below separate upper and lower predetermined limits, comprising:
   (a) a negative resistance device characterized by a substantially N shaped voltage-current characteristic, and having an anode terminal and a cathode terminal,
   (b) means for establishing a reference current and separate reference voltages at each of the anode and cathode terminals to normally bias the negative resistance device in a low voltage-high current state,
   (c) means for connecting a first source of input voltage to be monitored for excursions above the upper predetermined limit to the anode terminal,
   (d) means for connecting a second source of input voltage to be monitored for excursions below the lower predetermined limit to the cathode terminal, and
   (e) output means connected across the anode and cathode terminals and responsive to the voltage drop across the negative resistance device, whereby excursions of either one of the input voltages beyond its respective limit biases the negative resistance device in a high voltage-low current state, which condition is detected by the output means.

4. An electronic apparatus for sensing voltage deviations both above and below separate upper and lower predetermined limits, comprising:
   (a) a tunnel diode having an anode and a cathode;
   (b) means for establishing a reference current and separate reference voltages at said anode and said cathode to normally bias the tunnel diode in a low voltage-high current state;
   (c) means for applying a source of input voltage to be monitored to said anode and cathode, said means comprising:
      (1) a first diode connected between the source of input voltage and said anode of said tunnel diode and arranged for positive to negative conduction in the forward direction from the source to said anode, and
      (2) a second diode connected between the source of input voltage and said cathode of said tunnel diode and arrange for positive to negative conduction in the forward direction from said cathode to the source; and (d) output means connected across said anode and cathode and responsive to the voltage drop across the tunnel diode, whereby excursions of the input voltage either above or below the predetermined limits bias the tunnel diode in a high voltage-low current state, which condition is detected by said output means.

5. An electronic apparatus for sensing voltage deviations both above and below separate upper and lower predetermined limits, comprising:
   (a) a tunnel diode having an anode and a cathode;
   (b) means for establishing a reference current and separate reference voltages at said anode and cathode to normally bias said tunnel diode in a low voltage-high current state, said means comprising:
      (1) means connecting a level of current to said anode through a variable resistor, and
      (2) means connecting a level of potential to said cathode through a diode connected between said cathode and said potential level so as to permit positive to negative forward conduction from said cathode to said potential level;
   (c) means for applying a source of input voltage to be monitored to said anode and said cathode; and
   (d) output means connected across said anode and cathode and responsive to the voltage drop across the tunnel diode, whereby excursions of the input voltage either above or below the predetermined limits bias the tunnel diode in a high voltage-low current state, which condition is detected by said output means.

6. An electronic apparatus for sensing voltage deviations both above and below separate upper and lower predetermined limits, comprising:
   (a) a tunnel diode having an anode and a cathode;
   (b) means for establishing a reference current and separate positive reference voltages at said anode and said cathode to normally bias the tunnel diode in a low voltage-high current state;
   (c) means for applying a source of positive input voltage to be monitored to said anode and said cathode, said means comprising:
      (1) a diode connected between the source of input voltage and said anode and arranged for positive to negative conduction in the forward direction from the source to said anode, and
      (2) a resistor connected between the source of input voltage and said cathode; and
   (d) output means connected across said anode and cathode and responsive to the voltage drop across the tunnel diode, whereby excursions of the input voltage either above or below the predetermined limits bias the tunnel diode in a high voltage-low current state, which condition is detected by said output means.

References Cited
UNITED STATES PATENTS

| | | | |
|---|---|---|---|
| 3,061,743 | 10/1962 | Fukui et al. | 307—88.5 |
| 3,187,273 | 6/1965 | Chasek | 307—88.5 XR |
| 3,189,760 | 6/1965 | Uzunoglu et al. | 307—88.5 |

JOHN S. HEYMAN, *Primary Examiner.*

JOHN ZAZWORSKY, *Assistant Examiner.*

U.S. Cl. X.R.

307—286